United States Patent [19]

Powers et al.

[11] Patent Number: 5,127,430
[45] Date of Patent: Jul. 7, 1992

[54] CERAMIC WEIR FOR VALVE BODY

[75] Inventors: Kelly B. Powers; James M. Kutsko, both of Salt Lake City, Utah

[73] Assignee: Industrial Ceramics Engineering, Salt Lake City, Utah

[21] Appl. No.: 731,510

[22] Filed: Jul. 17, 1991

Related U.S. Application Data

[63] Continuation-in-part of Ser. No. 637,365, Jan. 4, 1991, which is a continuation-in-part of Ser. No. 473,334, Feb. 1, 1990, abandoned.

[51] Int. Cl.$^5$ .............................................. F16L 7/00
[52] U.S. Cl. .................................. 137/375; 251/331; 251/367; 251/368
[58] Field of Search ..................... 251/331, 367, 368; 137/375

[56] References Cited

U.S. PATENT DOCUMENTS

| | | | |
|---|---|---|---|
| 1,992,043 | 2/1935 | Saunders | 251/331 |
| 3,349,795 | 10/1967 | Matsutoni | 251/367 |
| 4,771,803 | 9/1988 | Berchem et al. | 137/375 |
| 4,791,953 | 12/1988 | Berchem | 137/375 |

FOREIGN PATENT DOCUMENTS

| | | | |
|---|---|---|---|
| 78070 | 12/1954 | Netherlands | 251/331 |
| 732201 | 6/1955 | United Kingdom | 251/331 |

Primary Examiner—A. Michael Chambers
Attorney, Agent, or Firm—James L. Sonntag

[57] ABSTRACT

A weir valve is disclosed with a solid ceramic weir insert. Optional ceramic pieces are used to line the bore and bonnet opening to protect the exposed inner surfaces of the valve body from fluid in the valve.

15 Claims, 7 Drawing Sheets

CERAMIC WEIR FOR VALVE BODY

RELATED APPLICATIONS

This application is a continuation-in-part of U.S. patent application, Ser. No. 07/637,365, filed Jan. 4, 1991 which is a continuation-in-part of U.S. patent application, Ser. No. 07/473,334 filed Feb. 1, 1990 now abandoned.

FIELD OF THE INVENTION

This invention relates to diaphragm valves of the weir-type.

BACKGROUND OF THE INVENTION

Corrosive liquids, such as strong acids and bases, and highly reactive chemical solutions, are frequently used in chemical processes. Liquids also may be abrasive or erosive, due to, for example, suspended solids in the liquid. Valves are particularly vulnerable to both corrosive and erosive environments due to moving mechanical parts of the valve and the necessity of maintaining the integrity of a fluid seal. Valves have been lined with various types of materials such as rubber, glass, plastic, and the like, to combat either a corrosive or erosive environment. For example, to provide corrosion resistance, iron valves may be lined with glass, or various rubbers such as butyl rubber, hard rubber, natural rubber, neoprene and the like. For erosion resistance, iron valves may be lined with or composed of hardened steel, or the like. Also, valves may be lined with various kinds of plastics (such as TEFLON™ or KYNAR™) or fiberglass-reinforced plastic. Lead has also been used to line valves, and many valves are coated with a thin layer of glass, which is generally applied in the form of low-temperature melting frit and then heated to form the glass lining in place.

While many lining materials are suitable for corrosive or erosive environments, most are not suitable for environments that are both erosive and corrosive, such as liquid acids containing suspended abrasive solids. Metal valves lined with rubber, glass, lead and, the like, are commercially used in these environments that are both corrosive and erosive, but the lifetime of these valves is relatively short, particularly where the fluid stream is moving at high velocities. None of these lining materials have a long life in handling a high-velocity, corrosive, and erosive liquids.

Ceramic materials are generally known for both corrosion and erosion resistance. Valves made of a ceramic material, however, can be difficult to form and consequently are relatively expensive. Furthermore, while ceramic devices can be corrosion and erosion resistant, they generally possess poor flexural stress resistance and impact toughness, so that a valve formed completely of ceramic could be easily fractured.

A popular design of valves for used in corrosive and erosive environments is of the so-called diaphragm valves. For example, U.S. patent application Ser. No. 07/637,365 discloses a diaphragm valve with a ceramic lined valve body. These valves have a straight-through bore with an elastomeric diaphragm that is extendable into the bore through a side opening to block the passage of fluid through the bore. These valves are very corrosion and erosion resistant as the valve bodies are completely lined with high-purity ceramic materials. However, since the diaphragm is of a flexible material, it is naturally not of the same corrosion resistant ceramic material. Corrosion resistant elastomeric materials for use in the diaphragms are known in the art; but generally the more corrosion resistant materials, particularly fluorinated elastomeric polymers such as teflon, have a lower elasticity and flexibility. In a straight-through valve the diaphragm must commonly be extended and stretched to an extent greater than is possible for the more corrosion-resistant elastomeric materials. Therefore, these more corrosion-resistant elastomeric materials cannot be used in these valves.

In order to solve this problem of insufficient elasticity of some diaphragm materials, diaphragm weir valves have been developed. Weir valves allow the use of diaphragm materials that have low elasticity and flexibility. In a weir valve a weir is disposed in the flow channel opposite the diaphragm. The weir partially blocks the flow channel, but provides a sealing surface on the top of the weir that is closer to the diaphragm than would be the case of a straight-through valve that has no weir. When the diaphragm is in the retracted position, fluid flows up and over the weir. When the valve is closed the diaphragm only extends to and seats against the top of the weir to provide a seal, instead of the diaphragm extending completely into and across the bore as in straight-through valves. Thus, in order for the valve to close completely, the diaphragm is not required to extend and stretch as far as in a straight-through valve.

Matsutani U.S. Pat. No. 3,349,795 discloses a diaphragm weir valve with a complex ceramic valve casing. The ceramic valve casing is a complex one-piece design shaped to fit within a complex valve body. The valve body and casing are shaped such that a arcuate top surface is formed to provide a weir curving downwards to a circular opening. The complex shape of Matsutani ceramic casing limits the method for manufacturing the shape mostly to slip casting methods. For this reason, such a complex shape is not conducive to fabrication from high-purity, high density ceramics materials, which on a commercial scale, requires fabrication by powder compaction methods, particular isostatic and uniaxial compaction methods. In addition, common machining methods, such as lathe forming, milling, cylindrical grinding, and surface grinding, cannot easily be used to form the shape because of its complexity. The ceramic materials that can be made into the shape of a Matsutani casing by slip casting methods are usually of a porcelain variety and typically of low purity, and do not have the corrosion resistance for many environments, particularly to highly caustic solutions. In addition, the complex shape of the Matsutani ceramic casing requires a specially constructed two-piece valve body so that the casing may be inserted into the valve body.

An additional problem with complex ceramic shapes, such as in the Matsutani reference, is that flexural stresses are inevitably induced in the ceramic shapes by pressure fluctuations, pipeline excursions, flange misalignment, and the like, which cause these shapes to be quite fragile. In addition, such one-piece complex shapes are subject to thermal flexural stresses due the differing thermal expansion coefficients of the ceramic and the metal of the valve material.

OBJECTS OF THE INVENTION

It is, therefore, an object of the invention to provide a weir valve that is resistant to both erosive and corrosive liquids.

It is further an object of the invention to provide a weir valve with a weir of a ceramic material, but without the poor structural integrity and fragility of the ceramic shape of prior-art valves.

It is further an object of the invention to provide a ceramic-surfaced weir valve without the poor structural integrity of valves made entirely of ceramic.

It is further an object of the invention to provide a ceramic weir valve line with ceramic parts that can be made using common ceramic fabrication methods, i.e., isostatic or uniaxial pressing, milling, lathe cutting, cylindrical grinding, and surface grinding, which are intrinsically lower cost ceramic processes.

Further objects of the invention will become evident in the description below.

SUMMARY OF THE INVENTION

An embodiment of the invention is a weir valve comprising:

(a) a nonceramic valve body having a bore extending along a bore axis, a bonnet containing a bore closure actuator means attached to a flexible diaphragm means, the diaphragm means disposed such that it can be advanced by the actuator means into the bore through a bonnet opening extending into the bore from the bonnet; and (b) a weir formed by solid ceramic weir insert disposed in the bore opposite the bonnet opening, the weir insert having a barrier means extending partially into the bore transverse to the axis of the bore, and having a top sealing surface, such that when the diaphragm means is fully advanced it abuts the sealing surface and a seal is provided to prevent the flow of fluid through the bore.

The weir insert is of solid ceramic material, preferably a high purity highly corrosion resistant ceramic material. The weir insert can be manufactured by forming a green ceramic, machining to near the final configuration, and heating under pressure to sinter the ceramic. The unmachined green ceramic part is typically a solid right cylinder, but may other simple geometric solids, particularly those defined by moving a plane figure through the third dimension perpendicular to the plane of the figure.

In addition to the weir insert, the valve of the invention may also include other separate ceramic parts to cover and protect the inner surface of the valve body from the fluids in the valve.

Preferably, the valve of the invention also includes ceramic bore liners positioned within the bore on either side of the weir insert. The liners are coextensive with at least a portion of the inner surface of the valve body in the bore to substantially prevent exposure of said inner surface to fluids within the bore. The liners are cylindrical with a hollow interior and have a longitudinal axis substantially corresponding with the axis of the bore.

To provide a transition between the liners and the weir insert, an intermediate transition piece or pieces may be provided. A transition piece is desired to simplify the configuration of the weir insert and the bore liners to enable manufacture by conventional machining techniques. A transition piece also may protect portions of the valve body surface from fluids in the valve and provide a continuous ceramic surface exposed to the fluids in the valve. A transition piece also may be used to provide a smooth flow transition between the bore liners and the weir insert. There may be two transition pieces, one between the weir insert and each bore liner, or a single transition piece that surrounds the weir insert and provides a transition for both bore liners. Instead of the transition piece, the weir insert may be fabricated to include additional integral elements to match with the bore liners and cover exposed metal surfaces of the valve body, or the weir insert and the ends of the bore liners may be shaped to fit against one another and cover the exposed surfaces of the valve body interior without any other ceramic parts.

The valves of the invention are not only more resistant to corrosion and/or erosion than valves of the prior art, but particularly in the case of the fully lined valve with bore liner, are also essentially non-contaminating. Thus, these valves are ideal in corrosive and erosive environments. In addition, since the valve body is not ceramic, it is possible to avoid problems of structural integrity of valve with ceramic valve bodies. The ceramic parts, the weir insert, transition piece and bore liners can be configured with geometrical shapes that permit use of conventional machining techniques for ceramics, if necessary, to provide the fit, form and function required; techniques such as milling, lathe, cylindrical grinding, and surface grinding. The ceramic parts are subject to little of both mechanical and thermal flexural stresses, since the parts are separate components and are of a relatively simple configuration, most stress is compressive. Accordingly the ceramic weir inserts, transition pieces, and bore liners are much less fragile than the more complex-shaped, one-piece ceramic valve linings. In addition, since the configuration allows manufacture of the ceramic parts from high-strength, high-purity ceramic materials, the ceramic parts are substantially less fragile than complex linings that must be manufactured in a single piece by slip-casting methods.

DETAILED DESCRIPTION OF THE INVENTION

The nonceramic valve bodies are valve bodies of any nonceramic material, preferably a material conventionally used in valve construction, e.g., a metal such as cast steel or cast iron. The configuration is similar to that of conventional diaphragm valves, but the valve body is machined to accept the weir insert, and, if applicable, other ceramic parts, such as a transition piece or pieces and bore liners. The complete valve assembly of the invention has a functional configuration essentially the same as a conventional weir valve, except that the valve weir in not integral with the bore, but is provided as a separate piece in the form of the ceramic weir insert. In addition, in the preferred embodiment of the invention, all the surfaces of the valve body exposed to the fluid in the valve have a ceramic surface. The ceramic surface is provided by the weir insert, and other ceramic parts, i.e., bore liners, and transition pieces as required.

In conventional valve construction, the metal bonnet is attached generally by way of a flange to the valve body at right angles. The bonnet houses a bore closure actuator means, typically in the form of a screw-actuated compressor member, which extends and retracts a diaphragm means, which is usually a flexible rubber-like diaphragm fixed to the compressor member. The diaphragm is fixed to the valve bonnet or valve body at its periphery to form a seal that prevents liquids or fluids within the central bore from invading the interior of the valve bonnet. By operation of the compressor member the diaphragm is advanced through the bonnet opening to abut with the upper sealing surface of the weir insert to provide a fluid seal for fluid flowing through the valve body.

The weir insert comprises a barrier means that extends partially into the bore, partially blocking the flow path through the valve. The top surface of the weir insert is adapted as a sealing surface. When the diaphragm means is fully extended into the bore, the diaphragm means abuts the sealing surface to provide a seal to the flow of fluid through the valve. The weir insert is configured to fit within the bore and prevent the flow of fluid under and around the sides of the barrier means.

Preferably, the bore is machined to provide a weir cavity to receive the weir insert. The weir cavity permits a simpler configuration of the weir insert and affixes the weir insert more securely. In a preferred embodiment, the weir insert has a circular base with the barrier means extending upward from the base and fully along a diameter of the base. The top surface of the weir insert is adapted to provide the sealing surface to cooperate with the underside of the diaphragm means to provide a fluid seal. The valve body is machined with a circular weir cavity to receive the weir insert. The weir cavity extends from the bore and opposite the diaphragm means.

Two hollow cylindrical ceramic bore liners are preferably provided to line the bore of the valve body on both sides of weir insert. The bores of the valve body are essentially straight and extend on either side of the weir along a single axis along the main axis of the valve body and transverse to the alignment of the weir. Each bore liner is cylindrical to fit with the inner surface of the bore of the valve body and each has a hollow interior to provide a fluid flow path. By "cylindrical" is meant the shape formed by a closed curved line in a plane moved along an axis not in the plane. The term "cylindrical" also can be described as the surface traced by a straight line moving parallel to a fixed straight axis line and intersecting a fixed closed curve. The cross-section of the cylindrical bore liner is usually circular, but may be non-circular. The shape of the end of the bore liner near the weir insert is designed to conform with the weir insert, or a transition piece, to provide a continuous ceramic surface exposed to fluid in the valve. The ends of the bore liner at the inlet and outlet are preferably cut perpendicular to the bore axis, and bore liners preferably extend to the ends of the bore at the inlet and outlet of the valve, to cover completely the inner surface of the bore.

A transition piece or pieces is preferred where it is desired to simplify the configuration of the bore liners and the weir insert, and still provide a continuous ceramic surface between the bore liners and weir insert covering the valve body exposed to fluids. In a preferred embodiment of the invention, the transition piece is in the form of a right hollow cylinder having a circular base and an inner diameter corresponding with the diameter of the base of the weir insert. To provide a fluid flow path, two apertures of the same inside diameter as that of the bore liners are placed in the walls of the hollow cylinder at either end of a diameter line. The weir insert fits within the interior of the cylinder with the barrier means aligned perpendicular to the general direction of fluid flow. The general direction of fluid flow in this case corresponds to the diameter axis line between the centers of the apertures of the transition piece, and is an extension of the center axes of the bore liners. The fluid flow path through the valve is in through a bore liner, into the transition piece through an aperture of the transition piece, over the weir insert, and out through the opposite aperture in the transition piece and through the other bore liner.

Preferably the exterior of the cylindrical transition piece is sized to fit into a weir aperture and covers the lateral sides of the weir aperture. The weir aperture is disposed opposite of, and is preferably dimensioned the same as and continuous with the bonnet opening, forming one essentially cylindrical cavity with the bonnet opening on one side of the bore, and the weir cavity as extension of the bonnet opening on the opposite side of the bore. Accordingly the flexible diaphragm will fit at the top of the transition piece, forming a seal at the peripheral edges of the diaphragm, with the bore liners extending on either side from the apertures. The transition piece fits into the cylindrical weir cavity/bonnet opening, and extends from the bottom of the weir cavity into the bonnet opening with the upper circular surface of the transition piece abutting against the periphery of the diaphragm providing the seal between the fluid containing interior of the valve and the interior of the bonnet. To close the valve, the diaphragm means is extended into the interior of the transition piece until it abuts and seals against the top surface of the weir insert.

Since the diaphragm means is preferably a corrosion resistant elastomeric material, preferably a elastomeric fluorocarbon such as Teflon.

The weir insert, bore liners and transition piece are fabricated completely from a ceramic, preferably a high purity ceramic resistant to corrosion and erosion. Preferred ceramic materials are alumina, and zirconia.

Typically, the interior of the valve body is machined to dimensions slightly larger than the outside dimensions of the ceramic parts to be fitted in the valve body. The ceramic parts being the weir insert, and other ceramic parts designed to protect the inner nonceramic surfaces of the valve body, e.g., a transition piece, bore liners. The slightly larger dimension provides a thin space between the inner valve surface and the outer ceramic surfaces. For example, if the bore liner cross-section is circular, the outside diameter of the liner has a diameter slightly less than the inside diameter of the machined bore. The ceramic parts have precisely dimensioned external surfaces to provide the thin, precise space between the external surface of the ceramic parts and the internal surface of the valve body. The thin space at any point preferably does not exceed about 0.02 inches (0.5 mm), more preferably 0.01 (0.25 mm), and is preferably not less than about 0.002 inches (0.05 mm).

The ceramic parts are fixed to the inside surfaces of the valve body by a thin bonding layer contained in the thin space between the outer surface of the ceramic parts and the inside surface of the valve body. The bonding layer may be any bonding system in which two surfaces are joined by an intermediate bonding layer. The bonding layer should preferably fill completely the thin space to prevent infiltration of fluid from the valve interior into the thin space. The bonding layer preferably has some flexibility to absorb thermal and mechanical stresses between the surfaces being bonded.

Suitable materials for the bonding layer include those that are resistant to the environment to which the valve is to be exposed. Preferably the bonding layer has a high chemical resistance. In a preferred embodiment, an uncured material for the bonding layer is injected into the thin space and then cured. However, the uncured bonding-layer material, while being injectable, also should have a sufficiently high viscosity to remain in the thin space while being cured. Alternately an uncured material may be applied to either or both the ceramic part surface and valve body surface, and then the ceramic part inserted into the valve body and the bonding material cured.

A preferred bonding material is an adhesive that is preferably anaerobic, and produces no byproducts during curing that may interfere with formation of a continuous bond between the ceramic parts and the inner valve body surfaces. Suitable adhesives include the epoxy resins. In addition, chemically resistant thermoplastics can be coated upon a surface (either of both the surfaces of the valve body and the ceramic part). The surface is heated to soften the thermoplastic and the surfaces of the valve body and ceramic part to be bonded are placed together and the thermoplastic is allowed to cool. The bonding material in this embodiment may be any suitable thermoplastic material, but is preferably a fluorinated hydrocarbon polymer, such as polytetrafluoroethylene (PTFE), perfluoro(alkoxyalkane) copolymer (PFA), perfluoro(ethylene-propylene) copolymer (FEP), polyvinylidine fluoride (PVDF), ethylene-chlorotrifluoroethylene copolymer (ECTFE), ethylene-tetrafluoroethylene copolymer (ETFE). Materials which can be electrostatically applied to the valve body are preferred, such as PFA and ETFE. In a preferred embodiment, the ceramic parts are coated by heating and fusing the thermoplastic upon the surface, and then the parts are allowed to fully cool. The valve body is coated and the thermoplastic fused at an appropriate temperature, but before the valve body cools and while the fluorocarbon is still in a plastic state, the ceramic part is inserted into the valve body. As the valve body then cools, it contracts around the ceramic part to press the surfaces together and provide an improved bond. Optionally, a suspension of fluorocarbon powder may be injected between adjacent teflon coated ceramic and metallic surfaces and heated to fuse the powder and provide a bonding layer.

Where the surfaces of the ceramic part abut one another, it is preferred to bond surfaces together using the same material used to bond the ceramic surfaces on the nonceramic surfaces of the valve body. The bonding material may be introduced between the surfaces by any suitable method, e.g., by injection.

As an example of bonding of the ceramic parts to the valve body using a two-part epoxy resin as the bonding material. The valve body is precisely machined to a dimension slightly larger than the outside dimensions of the ceramic parts to provide a small thin space. The ceramic parts inserted and positioned within the valve body and the two components of the epoxy resin are mixed. The mixed resin is then injected through predrilled holes in the valve body into the thin space between the inner surface of the valve body and the ceramic part. The epoxy is then allowed to cure in place. A suitable epoxy is available under the name of Master Bond Polymer System EP21AR, or Master Bond Polymer System EP21HTAR-1 by Master Bond, Inc., Hackensac, N.J. Other suitable epoxy is available under the name of "Brushable Ceramic" (No. 11760), from Devcon, Inc., Danvers, Mass., and "B. F. Goodrich EX 314" from B. F. Goodrich, Inc. in Akron, Ohio.

As an example of bonding of a ceramic part using a fluorinated hydrocarbon with an adhesive for the bonding layer. The fluorinated hydrocarbon used is ETFE, available under the name of TEFZEL TM from DuPont. The fluorinated hydrocarbon is first applied to the valve body casting after sand blasting the casting to etch the surface, and cleaning the surface. The valve body casting is then electrostatically sprayed with TEFZEL powder, and then fused at a temperature of about 330° C. The powder is sprayed in an amount to provide a fused layer of fluorocarbon with a thickness of about 3 to 10 mils (0.08 to 0.3 mm), preferably 4 to 5 mils (0.1 to 0.13 mm). Mixed with the TEFZEL powder before spraying is a particulate epoxy resin, which serves as an organic filler. After the fusion of the TEFZEL, the TEFZEL fluorocarbon encapsulates the organic filler within the layer, the organic filler existing as discrete particles in a matrix of the TEFZEL. However the surface of the TEFZEL layer is also modified to provide a more suitable surface for bonding to the ceramic as described below. The organic filler may be added in an amount between about 20 and 50 weight percent, preferably about 30 weight percent.

The surface of the fluorocarbon is then etched using a conventional etchant containing potassium or sodium salts. Alternately the surface may be mechanically abraded.

The ceramic parts are then inserted and positioned within the valve body. Appropriate fixturing is used to assure concentric location of the ceramic parts within the cast metal valve body to assure a uniform thin space between the ceramic parts and the cast valve body for a uniform adhesive bond line. The adhesive is injected in the thin space between the ceramic parts and the valve body, and in the spaces or joints between the ceramic parts in order to seal these joints and provide smooth surfaces. Optionally, an adhesive curable at an elevated temperature is used and the assembly of the ceramic parts and valve body heated to cure the adhesive. The adhesive is preferably an anaerobic or two-part epoxy adhesive that forms no byproducts upon curing. The adhesive also should have a high resistance to chemical corrosion. The viscosity of the adhesive should be low enough to allow insertion of the parts and injection of the adhesive, but high enough so that the adhesive does not flow from the thin space between the ceramic parts and the valve body while it is curing. Preferably the adhesive contains a thixotropic additive, which allows the adhesive to have a reduced viscosity under shear or pressure load.

The adhesive preferably contains one or more coupling agents known in the art to enhance the bonding between organic and non-organic surfaces. These materials are often used for composites of a polymer matrix with an inorganic filler. Examples of suitable coupling agents are titanate, zirconate, and aluminate coupling agents, such as monoalkoxy, chelate, coordinate, quat, neoalkoxy, and cycloheteroatom titanate coupling agents. The coupling agent is typically added in amount between about 2 and about 5, preferably about 2 weight percent. Preferably, alumina powder or silicon carbide is added to the adhesive (preferably from about 20 to 60 weight percent) as a filler. The alumina filler improves the abrasion resistance of the cured adhesive, and improves the uncured adhesive's ability to fill gaps and remain immobile during curing. Titania also may be added (from about 2 to 10 weight percent) to adjust the color closer to the ceramic parts.

The bonding system here described provides a bond between the valve body and the ceramic parts that is highly resistant to chemical corrosion and to failure of the bond. Since the high-purity, high-density ceramic materials used for the parts are essentially inert to chemical corrosion, in both caustic and acidic environments, the most vulnerable part of the assembled valve of the invention in the interface or bond between the ceramic and the valve body. If the bond fails, then fluids flowing through the valve may reach and corrode the metal of the valve body. By use of the above adhesive materials, a suitable bond is provided. However, the addition of the fluorocarbon layer provides further protection of the valve body from corrosion in the event of failure of the adhesive of the bonding layer. To insure that there is a bond over the entire exterior surface of the ceramic parts, it is necessary that the entire space between the exterior of the ceramic parts and the interior fluorocarbon lined surface of the valve body be filled with the adhesive before curing. To insure this, it may be necessary to inject the adhesive through holes in the valve body. Optionally, alumina powder may be added to the fluorocarbon to increase abrasion resistance, preferably in an amount between 15 and 85 weight percent.

The valve bodies of the invention may be made by machining standard as-manufactured weir or straight-through valves, but are preferably manufactured specifically to accommodate the ceramic parts to line the valve. For example, ceramic lined diaphragm valves may be prepared from a standard cast iron valve by machining the bore of cast iron to obtain a larger internal diameter to accommodate ceramic bore liners, and the weir cavity may be machined in the bore opposite the diaphragm to accommodate a transition piece and weir insert. Preferably, in this embodiment the internal diameter of the bore liners is substantially the same as the diameter of the original bore of the cast iron valves, i.e., the internal diameter of standard pipe, and the machining must remove a thickness of valve substantially equal to the thickness of the liner. The bore of the valve is generally machined to form a right cylinder, however, a tapered bore may be formed to receive a bore liner that has a tapered external surface and, preferably, an internal liner bore that is a right cylinder. The maximum taper useful for such tapered bore liners is about 15°, and preferably about 10°, included angle.

For valves specifically manufactured for the ceramic parts, a specially structured metal valve may be manufactured that is cast with a larger-than-usual bore and with a weir cavity so that minimal machining is necessary to form a valve interior adapted to accept the ceramic parts. In this embodiment, the inner diameter of the bore liners is substantially equal to that of connecting pipes. Generally, valves are denominated by the diameter of their bores, e.g., a two-inch valve is one that has a bore having a nominal diameter of two inches.

Preferably, the transition of the surface between the bore of the ceramic bore liner and the piping connected to the valve is smooth. Where the bore cross-section of the liner is circular the inner diameter of the ceramic bore liner preferably approximates the inner diameter of any pipe or conduit connected to the valve body. Thus, the outer diameter of the ceramic bore liner should preferably exceed the inner diameter of any connecting pipe. Having the inner diameter of the bore liners and the inner diameter of connecting pipes substantially equal not only protects any bonding material from the corrosive/erosive effect of flowing fluids but it also avoids any shoulder being presented to the flowing fluid either at the entry or exit of the valves.

Typically, as-manufactured conventional weir valves have bores of a circular cross-section, and bore liners with a circular cross-section may be used for these valves as well as valve bodies specifically for use with ceramic weirs. However, for a specifically made valve body the bore liners may have a noncircular cross-section. Since valves are conventionally incorporated into piping systems with circular cross-section, it is preferable that ceramic lined valves with a non-circular cross-section also comprise ceramic transition rings in the bore on the outer ends of the ceramic bore liners, as disclosed in U.S. Ser. No. 07/637,365. These end transition rings provide a smooth fluid flow transition between the circular pipe cross-section, and the non-circular cross-section of the ceramic lined valve bore. However, it is also within the contemplation of the invention to have no transitional end rings, or to machine the ends of the bore liners to provide a transition. Where transition rings are used, the valve body is shaped to receive the transition rings. Transition rings can be bonded to the valve body in the same manner as the other ceramic parts, preferably using the same bonding system, with a bonding layer also between adjacent ceramic surfaces.

The ceramic parts are made by any suitable process for fabrication of high-purity, high-density ceramic shapes. Typically the ceramic parts are produced by isostatically pressing a high-purity ceramic powder to form a suitable shape. The preferred weir insert is manufactured by molding a green ceramic solid cylinder, and machining, e.g., by milling, the barrier means and sealing surface into the green shape. The preferred transition piece and bore liners are essentially hollow right cylinders. The bore-liners will typically require some shaping of the end that abuts the transition piece, but this represents shaping easily done by milling techniques. The machined ceramic shapes are then sintered at suitable pressures and temperatures for the ceramic material used. The sintered shapes may then be machined to the final dimensions, if required, by conventional techniques. An appropriate ceramic powder is preferably high-purity alumina or zirconia, although other ceramic powders or mixed ceramic powders may be used. For alumina the powder should have at least about 95 wt. % purity, and for zirconia, about 90 wt. % purity. Zirconia and alumina are preferred as, both alumina and zirconia have good corrosion and abrasion resistance when sintered to a high density that is near the theoretical density (at least about 95% theoretical density).

The sintered ceramic parts are preferably dimensioned to provide a precise thin space between the external surface of the ceramic part and the internal surface of the valve body.

The transition piece and the bore liners preferably have the same or similar wall thickness. A preferred wall thickness of the bore liners is between about 5% and 15%, preferably about 10%, of the nominal or maximum internal diameter of the liner. Thus, a two-inch valve would preferably have a liner with a bore of about 2 inches (5 cm) in diameter with a wall thickness of about 0.2 inches (0.5 cm).

Figure 1:
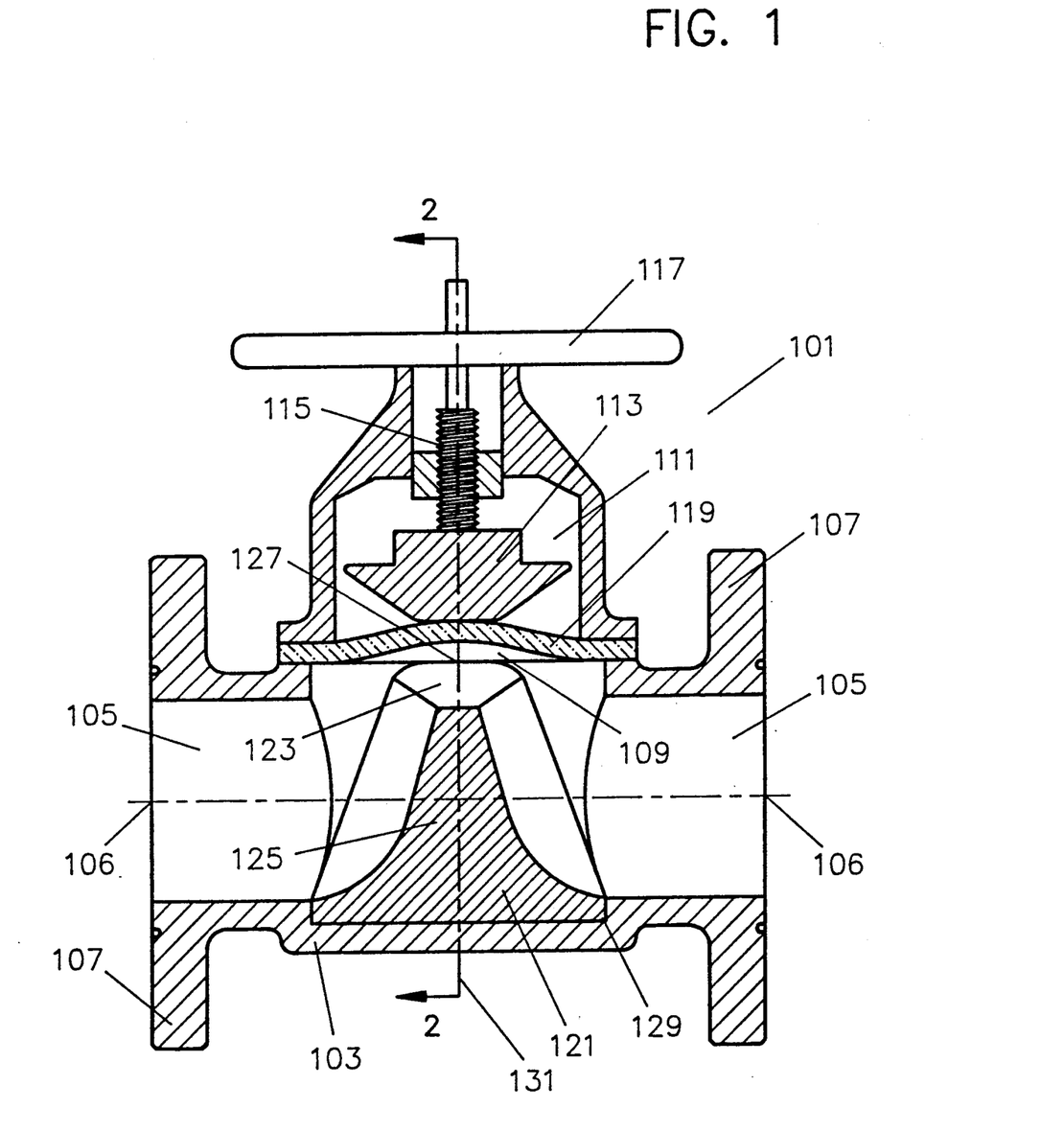
FIG. 1 is a side elevational, sectional view of a weir valve of the invention having a ceramic weir insert.
Figure 2:
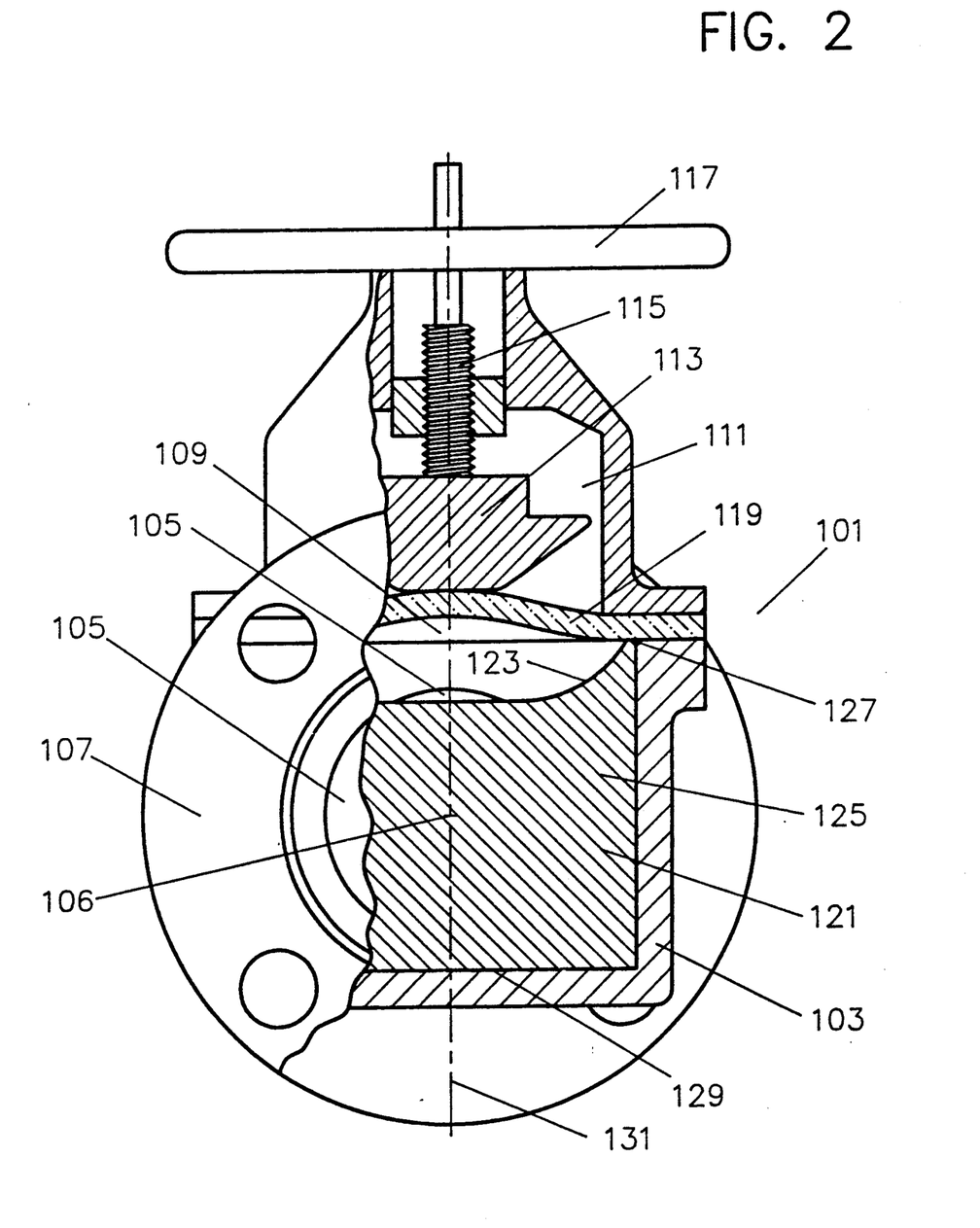
FIG. 2 is an end view in partial sectional of the valve of FIG. 1.

FIG. 1 is a cross-section, and FIG. 2 a partial cross-section through line 2—2 of FIG. 1, of a valve of the invention. Referring to FIGS. 1 and 2, a weir valve of the invention 101 has a valve body 103 of a nonceramic material. A bore 105 extends through the valve body and defines a flow path for fluid through the bore generally along the bore axis 106. At the ends of the bore, the valve body 103 is adapted, e.g., by conventional attachment flanges 107, for connection to conventional piping. Approximately midway between ends, a bonnet opening 109 extends from the bore 105 in a direction perpendicular to the main bore axis 106. A bonnet 111 is disposed over the bonnet opening 109 and contains a bore closure actuator means 113, which in this embodiment, comprises a screw 115 operated by a handle 117. The actuator means 113 is attached to a diaphragm means 119, which typically is a flexible diaphragm of elastomeric material. The diaphragm means 119 is placed over the bonnet opening 109, with the edges of the diaphragm means 119 extending to the periphery of the bonnet opening 109 to provide a complete fluid seal between the bore 105 and the interior of the bonnet 111.

Opposite the bonnet opening 109 and the diaphragm means 119 in the bore 105 is a weir insert 121 comprising a solid ceramic material. The weir insert 121 comprises a top surface 123, and a barrier means 125 that extends partially into bore 105 transversely across the bore axis 106. The ends 127 of the top surface 123 extend to the top edge of the bonnet opening 109 are adjacent to the diaphragm 119. The top surface 123 is adapted to cooperate with the undersurface of the diaphragm 119, such that a fluid seal is provided when the diaphragm 119 is fully advanced. The top surface 123 is generally concave to increase the cross-sectional area of the flow path over the top surface 123, as the cross-section of the flow path at the center of the top surface 123 is defined by the surfaces that extend between the ends 127 of the top surface 123 and of the diaphragm 119.

The barrier means 125 of the weir insert 121 is designed to prevent fluid flow except over the top surface, and is necessary to provide a fluid seal when the valve is closed. The barrier means 125 may be any suitable configuration. Preferably, the surface of the barrier means 125 is angled and/or curved, as in FIG. 1, to fluid-dynamically reduce the flow friction of fluid through the valve 101, and to evenly distribute the compressive forces from the diaphragm 119 when the valve is closed. However, the surface of the barrier means 125 may simply extend perpendicular to the axis of the bore or have any other suitable angle or configuration.

By turning the handle 117 of the actuator means, the actuator means advances the diaphragm 119 into the bore 105 toward the weir insert 121 such that the diaphragm comes against the sealing portion of the top surface 123 of the weir insert 121. Thus a seal is provided against the flow of fluid through the bore 105.

In the valve body 103 of FIGS. 1 and 2, a weir cavity 129 has been machined opposite the bonnet opening 109 to receive the weir insert 121. The weir cavity 129 preferably has the same center axis 131 as that of the bonnet opening 109 and has cross-sectional dimensions the same as the bonnet opening 109. Thus, the weir cavity 129 is essentially an extension or continuation of the bonnet opening 109 across the bore 105 and into but not through the wall of the valve body 103 opposite the bonnet opening 109.

Figure 3:
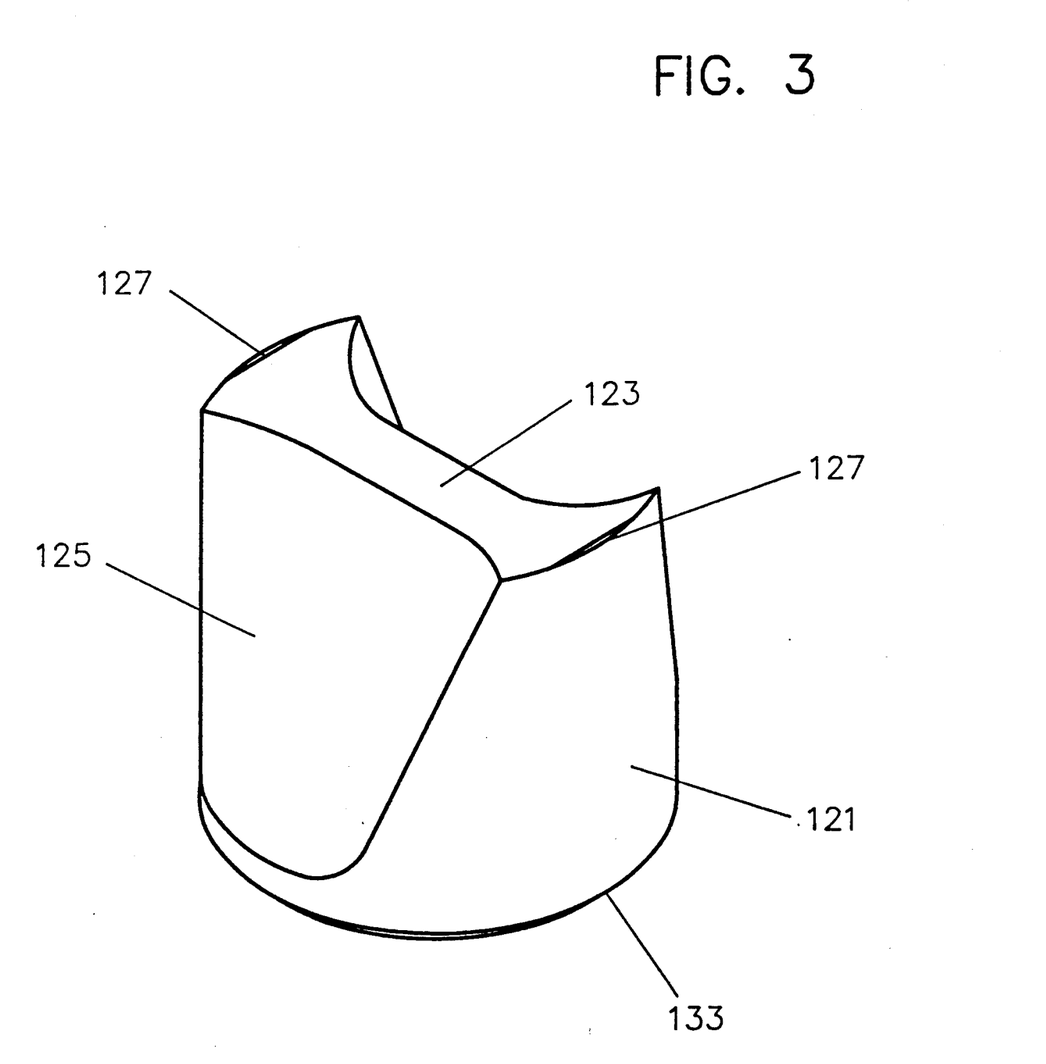
FIG. 3 is a perspective view of a weir insert of the invention.

Referring to FIG. 3, the weir insert 121 is essentially formed first as right solid cylinder with a diameter to fit into the weir cavity. The top of the cylinder is then machined to provide the arcuate concave top sealing surface 123, and the surface of the barrier means 125. The height of the weir piece, (the vertical distance between the base 133 to either end 127 of the top surface 123) is the same as the distance between the bottom of the weir cavity and the upper periphery of the bonnet opening in the valve body.

Figure 4:
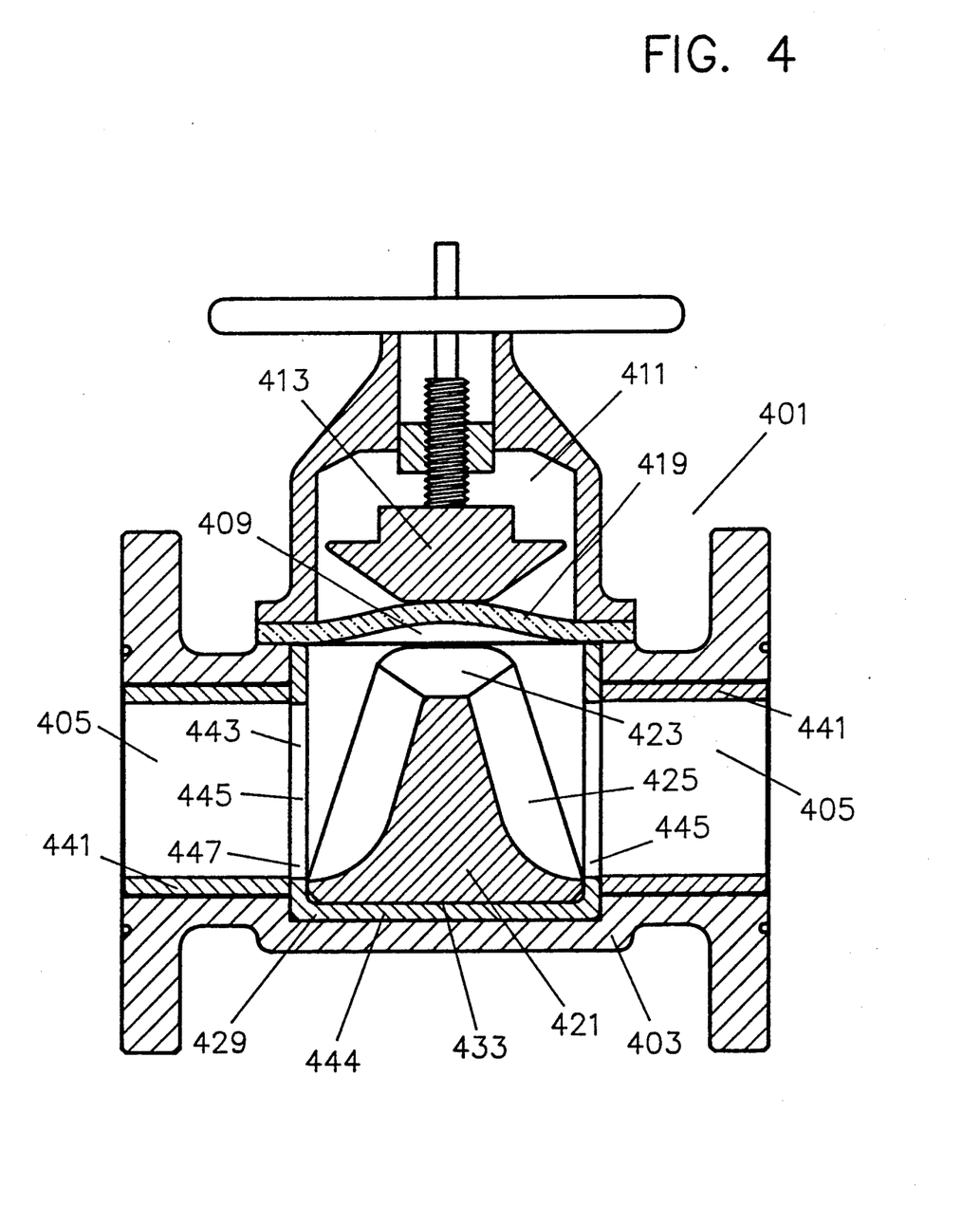
FIG. 4 is a side elevational, sectional view of a weir valve of the invention having a ceramic weir insert, bore liners and a transition piece.

The valve in FIGS. 1 and 2 is useful for abrasive fluids in which erosion of the weir is a particular problem, but may not be suitable for highly abrasive and corrosive fluids, in which case a valve body fully lined with ceramic is preferred, such as illustrated in FIG. 4.

Referring to FIG. 4, a valve 401 with nonceramic valve body 403 essentially as in FIGS. 1 and 2, with bore 405, bonnet opening 409, bonnet 411, closure actuator means 413, diaphragm means 419. The valve has a weir insert 421 similarly placed as in the embodiment of FIGS. 1 and 2 with a weir cavity 429 adapted to receive the weir insert 421. The weir insert 421, has a top surface 423, and a barrier means 425. The valve 401 also comprises two ceramic bore liners 441, one on either side of the bonnet opening 409. Each bore liner 441 extends to the end of the bore 405 at the inlet/outlet of the valve. A ceramic transition piece 443 is disposed between the bore liners 441 and the weir insert 421. The transition piece 443 is a hollow cylinder, and may have a closed bottom 444 to form a cup shape as shown or have an open bottom to form a hollow tubular shape. The transition piece has apertures 445 in the side walls corresponding to the bores of the adjacent bore liners 441, and which provide a flow path through the transition piece 443. The transition piece fits within the weir cavity 429, and the side walls 447 of the transition piece 443 extend from the bottom of the weir cavity 429 to the periphery of the bonnet opening 409, i.e., to the diaphragm 419, thus covering the interior surface of the bonnet opening 409 exposed to fluid with a ceramic.

The weir insert 421 is machined from a solid cylinder and fits within transition piece 443. The weir cavity 429 is dimensioned larger than the diameter of the weir insert 421 (dimensioned to the diameter of the transition piece 443) to accommodate not only the weir insert 421 but also the thickness of the side wall 447 of the transition piece 443. The transition piece 443 shown here is cup-like with a bottom, such that it covers all the metal surface (including the bottom) of the weir cavity 429. Alternately, the transition piece 443 may be tube-like with no such bottom, with the bottom surface 433 of the weir insert 421 adjacent to the bottom of the weir cavity 429.

Figure 5:
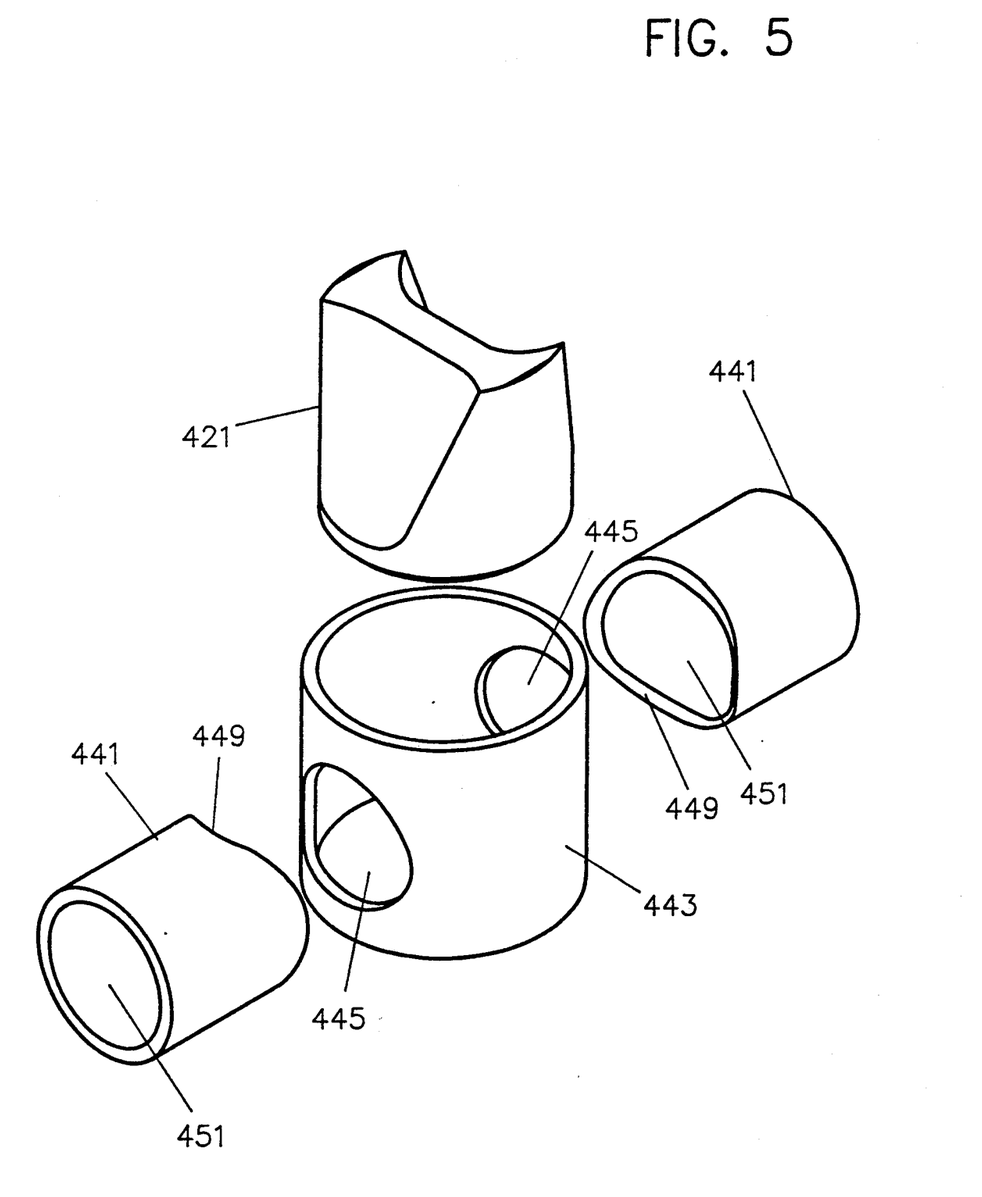
FIG. 5 is an exploded perspective view of the weir insert, transition piece and bore liners of the valve of FIG. 4.

FIG. 5 is an exploded perspective view showing the relative placement of the weir insert 421, the transition piece 443, and the bore liners 441 of the valve of FIG. 4. The ends 449 of the bore liners 441 adjacent to the transition piece 443 are machined with a cylindrical surface to match the outer surface of the transition piece 443. The apertures 445 in the transition piece 443 are circular and of the same diameter of the inside bores 451 of the bore liners 441.

Figure 6:
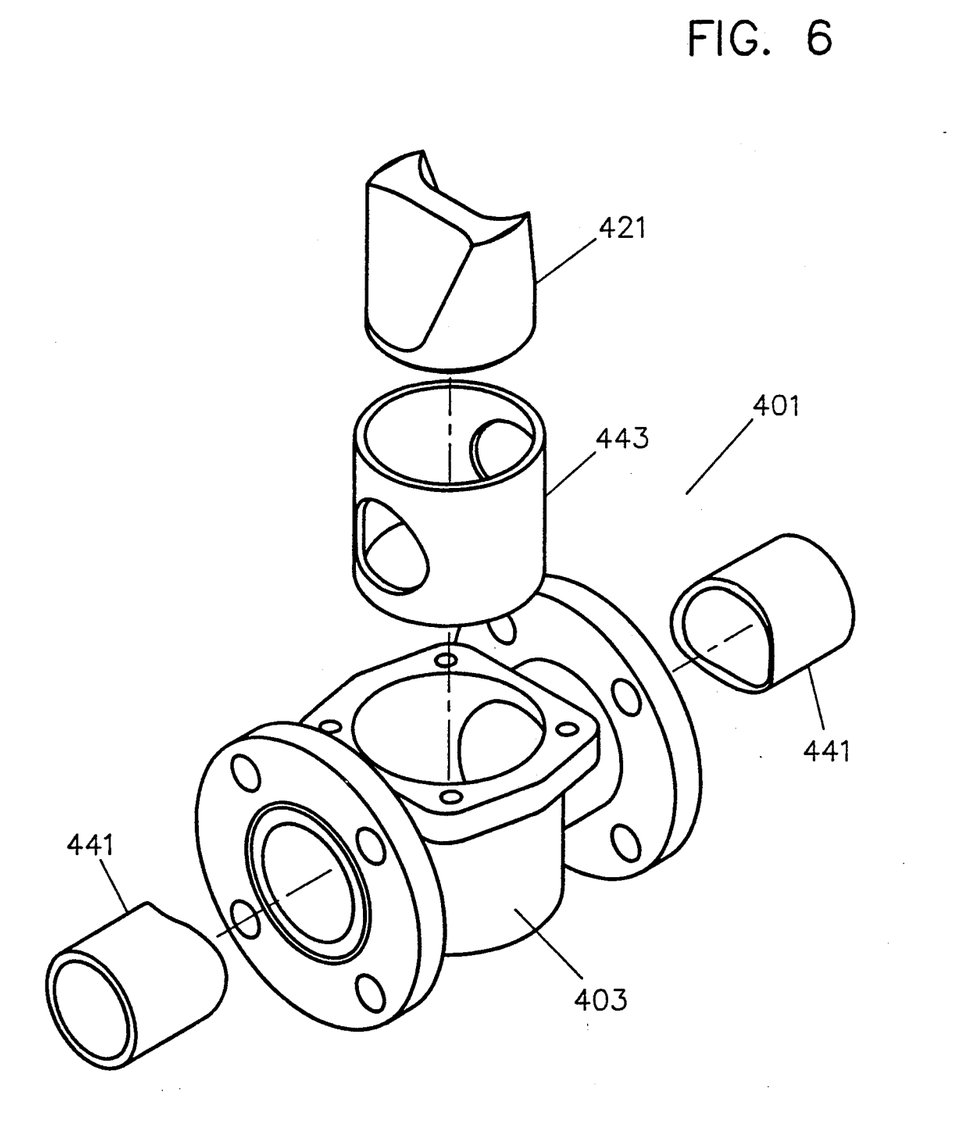
FIG. 6 is an exploded perspective view of the valve body of FIG. 4 with the weir insert, bore liners, and transition piece.

FIG. 6 is an exploded view of the valve body 401 of the valve of FIG. 4 showing the placement of the ceramic weir insert 421, transition piece 443 and bore liners 441 within the nonceramic valve body 403.

Figure 7:
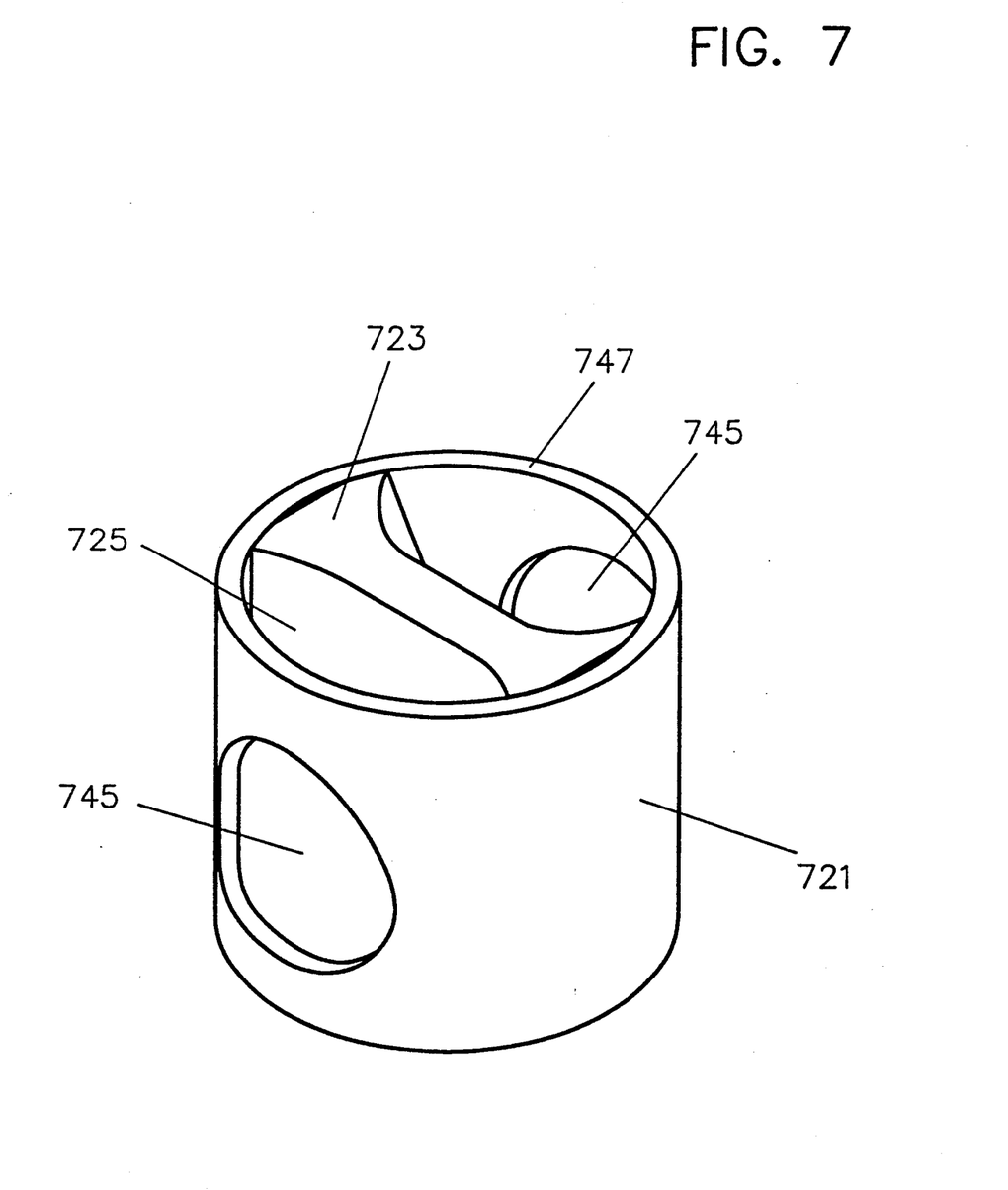
FIG. 7 is a perspective view of an alternate weir insert of the invention that may be used with bore liners without the use of a transition piece.

In an alternate embodiment, the transition piece 443 of a valve as in FIGS. 4, 5 and 6 may be eliminated by machining a weir insert adapted to fit the curved ends 449 of the bore lines 441. FIG. 7 is a perspective view of such a weir insert 721 with the fluid flow apertures 745, barrier means 725, and weir top surface 723. Liner side wall 747 is adapted to extend to the top edge of the bonnet opening are provided to protect the inner surfaces of the bonnet opening.

While this invention has been described with reference to specific embodiments and examples, it will be recognized by those skilled in the art that many variations are possible without departing from the scope and spirit of this invention, and that the invention, as described by the claims, is intended to cover all changes and modifications of the invention that do not depart from the spirit of the invention. For example, a solid ceramic weir insert may be fitted into a single bore liner extending the length of the valve and having a side opening corresponding to the bonnet opening. In addition, a ceramic weir insert may be provided, and the inner surfaces of the valve body sprayed, i.e., by plasma spraying, with corrosion resistant ceramic material.

What is claimed is:
1. A weir valve comprising:
  (a) a nonceramic valve body having a bore extending along a bore axis, a bonnet containing a bore closure actuator means attached to a flexible diaphragm means, the diaphragm means disposed such that it can be advanced by the actuator means into the bore through a bonnet opening extending into the bore from the bonnet; and
  (b) a weir means formed by a solid ceramic weir insert disposed in the bore opposite the bonnet opening, the weir insert having a barrier means extending partially into the bore transverse to the axis of the bore, and having a top sealing surface, such that when the diaphragm means is fully advanced it abuts the sealing surface and a seal is provided to prevent the flow of fluid through the bore.
2. A weir valve comprising:
  (a) a nonceramic valve body having a bore extending along a bore axis, a bonnet containing a bore closure actuator means attached to a flexible diaphragm means, the diaphragm means disposed such that it can be advanced by the actuator means into the bore through a bonnet opening extending into the bore from the bonnet; and
  (b) a weir means formed by solid ceramic weir insert disposed in the bore opposite the bonnet opening, the weir insert having a barrier means extending partially into the bore transverse to the axis of the bore, and having a top sealing surface, such that when the diaphragm means is fully advanced it abuts the sealing surface and a seal is provided to prevent the flow of fluid through the bore; and
  (c) two cylindrical ceramic bore liners positioned within the bore on either side of the weir insert, the liners having a hollow interior and a longitudinal axis corresponding substantially to the bore axis.
3. The valve of claim 2 wherein the one end of each bore liner is shaped to conform with the adjacent surface of the weir insert.
4. The valve of claim 2 additionally comprising a ceramic transition piece between the liners and the weir insert with adjacent surfaces of the transition piece conforming with adjacent surfaces of the weir insert and the bore liners.
5. The valve of claim 1 wherein the diaphragm means comprises an elastomeric fluorocarbon polymer.
6. The valve of claim 2 wherein a thin space is between adjacent surfaces of the valve body and the surfaces of the weir insert and bore liners.
7. The valve of claim 6 wherein the thin space is less than 0.02 inches.
8. The valve of claim 6 wherein the thin space is between 0.002 and 0.01 inches.
9. The valve of claim 6 wherein a bonding layer is in the thin space.
10. The valve of claim 9 wherein the bonding layer comprises an epoxy resin.
11. The valve of claim 10 wherein the bonding layer comprises a fluorocarbon polymer.
12. The valve of claim 2 wherein the weir insert and bore liners comprise at least 95 wt. % alumina and have a theoretical density greater than 95%.
13. The valve of claim 2 wherein the weir insert and bore liners comprise at least 90 wt. % zirconia and have a theoretical density greater than 95%.
14. A weir valve comprising:
  (a) a nonceramic valve body having a bore extending along a bore axis, a bonnet containing a bore closure actuator means attached to a flexible diaphragm means, the diaphragm means disposed such that it can be advanced by the actuator means into the bore through a bonnet opening extending into the bore from the bonnet;
  (b) a weir means formed by solid ceramic weir insert disposed in the bore opposite the bonnet opening, the weir insert having a barrier means extending partially into the bore transverse to the axis of the bore, and having a top sealing surface, such that when the diaphragm means is fully advanced it abuts the sealing surface and a seal is provided to prevent the flow of fluid through the bore, the weir means comprising a hollow cylinder with the barrier means within the hollow cylinder with two apertures in the cylinder wall to provide a flow path generally transverse to the barrier means; and
  (c) two cylindrical ceramic bore liners positioned within the bore on either side of the weir insert, the liners having a hollow interior and a longitudinal axis corresponding substantially to the bore axis, with one end of each bore liner shaped to conform with the adjacent surface of the weir insert.
15. A weir valve comprising:
  (a) a nonceramic valve body having a bore extending along a bore axis, a bonnet containing a bore closure actuator means attached to a flexible diaphragm means, the diaphragm means disposed such that it can be advanced by the actuator means into the bore through a bonnet opening extending into the bore from the bonnet; and (b) a weir means formed by solid ceramic weir insert disposed in the bore opposite the bonnet opening, the weir insert having a barrier means extending partially into the bore transverse to the axis of the bore, and having a top sealing surface, such that when the diaphragm means is fully advanced it abuts the sealing surface and a seal is provided to prevent the flow of fluid through the bore;

(c) two cylindrical ceramic bore liners positioned within the bore on either side of the weir insert, the liners having a hollow interior and a longitudinal axis corresponding substantially to the bore axis; and (d) a ceramic transition piece between the liners and the weir insert with adjacent surfaces of the transition piece conforming with adjacent surfaces of the weir insert and the bore liners, the transition piece being a hollow cylinder with two apertures in the cylinder wall to provide a flow path generally transverse to the barrier means when the weir insert is fitted within inner space of the transition piece.

* * * * *